US006334077B1

(12) United States Patent
Futsuhara et al.

(10) Patent No.: US 6,334,077 B1
(45) Date of Patent: Dec. 25, 2001

(54) OPERATION APPARATUS FOR PRESS

(75) Inventors: Koichi Futsuhara; Masayoshi Sakai, both of Urawa; Iwashige Takahashi; Yukio Hata, both of Komatsu, all of (JP)

(73) Assignee: The Nippon Signal Co., Ltd., Tokyo (JP)

( * ) Notice: Subject to any disclaimer, the term of this patent is extended or adjusted under 35 U.S.C. 154(b) by 0 days.

(21) Appl. No.: 09/156,688

(22) Filed: Sep. 18, 1998

(30) Foreign Application Priority Data

Sep. 19, 1997 (JP) ........................................ 9-255120

(51) Int. Cl.[7] ........................................ G06F 19/00
(52) U.S. Cl. ........................ 700/206; 100/48; 100/348
(58) Field of Search ........................ 700/206, 169; 100/43, 48, 341, 342, 348; 192/129 R, 130

(56) References Cited

U.S. PATENT DOCUMENTS 4,048,886 * 9/1977 Tettler ........................ 83/58
4,205,603 * 6/1980 Baker, Jr. ........................ 100/35
5,027,114 6/1991 Kawashima et al. ........................ 340/941
5,285,721 2/1994 Sugimoto et al. ........................ 100/43
5,345,138 9/1994 Mukaidono et al. ........................ 307/326
5,699,688 * 12/1997 Alfred ........................ 72/20.5

FOREIGN PATENT DOCUMENTS 60-68719 4/1985 (JP) .
61-38825 2/1986 (JP) .
6-84088 3/1994 (JP) .
WO 93/23772 11/1993 (WO) .
WO 94/02303 2/1994 (WO) .
WO 94/23303 10/1994 (WO) .
WO 95/10789 4/1995 (WO) .

* cited by examiner

*Primary Examiner*—Paul P. Gordon
(74) *Attorney, Agent, or Firm*—Finnegan, Henderson, Farabow, Garrett & Dunner, L.L.P.

(57) ABSTRACT

The present invention provides an operation apparatus for a press, of simple structure with lower cost. The operation apparatus for a press according to the present invention comprises a controlling system 1 for generating a slide actuation command signal $K_1$ by an ON operation of an operation button or an entrance/escape detection output of a human body by a light-beam type safety apparatus and controlling slide actuation, based on a crank angle signal from an encoder 4; a monitoring system 2 for monitoring controlling operation of the controlling system 1, including slide overrun monitoring function and the like, utilizing operation button ON signal T, operation button-OFF signal /T or the detection output from the light-beam type safety apparatus, position signals $P_a$ and $P_b$ indicative of slide elevating process and slide lowering process, respectively, position signal $P_h$ from a light-beam type safety apparatus, and slide actuation command OFF signal $/K_1$; and an AND gate 3 for generating a slide actuation signal S based on the slide actuation command signal $K_1$ from the controlling system 1, only when the normality judgment signals $K_2$, $K_3$ are being generated from the monitoring system 2.

20 Claims, 11 Drawing Sheets

OPERATION APPARATUS FOR PRESS

BACKGROUND OF THE INVENTION

1. Field of the Invention

The present invention relates to an operation apparatus for a press, and particularly to an operation apparatus for a press in which simplification and cost reduction of the apparatus are achieved while ensuring a fail-safe characteristic.

2. Related Art of the Invention

In a system of a recent press, there has been provided such a safety function that a slide of the press (i.e., movable part of the machine side) can be automatically stopped if there occurs such a situation danger for an operator, and the operation of slide is permitted only when such a safety function is guaranteed to be normally operating. Examples of such conventional presses include one described in U.S. Pat. No. 5,285,721, which has been proposed by the present applicant.

In such a conventional operation system, there are used four signals $P_1$ to $P_4$ for indicating slide positions such as shown in FIG. 15, so as to realize the aforementioned safety function of the press. Namely, by utilizing these four signals $P_1$ to $P_4$, it is monitored as to whether the slide, after its elevation, has stopped within a predetermined range near the top dead center or not (overrun monitoring function), in order to confirm the brake performance; and the actuation of slide is permitted only when the brake performance is confirmed to be normal. To monitor the overrun, it is confirmed as to whether an operation button is turned OFF during the slide elevating process (confirmation of operation button OFF). In the above, the signals $P_1$ to $P_4$ are indicated by the crank angles corresponding to respective slide positions.

The signal $P_1$ has logical value "1" within a range where the crank angle $\theta$ is from 340° to 15° and this range represents a range where the slide is to stop. Namely, the signal $P_1$ is for confirming as to whether the slide, after its automatic elevation, has stopped by the crank angle 15°.

The signal $P_2$ has logical value "1" within a range where the crank angle $\theta$ is from 345° to 300°, and this signal $P_2$ represents: a brake-performance-guaranteed lowering-motion-actuation starting point in case of slide lowering; and a range up to stoppage of automatic elevation of the slide. When this signal $P_2$ has just become logical value "0", the slide elevation should be stopped.

The signal $P_3$ has logical value "1" within a range where the crank angle $\theta$ is from 180° (bottom dead center) to 350°, and this signal $P_3$ represents a range of automatic elevation permission for the slide. In fact, the automatic elevation of slide is restricted at the crank angle of 300° represented by the signal $P_2$. Namely, the actual elevation permission range for the slide is the range (from 180° to 300°) in which both of signals $P_2$ and $P_3$ have logical value "1".

The signal $P_4$ has logical value "1" within a range where the crank angle $\theta$ is from 270° to 240°, and this signal $P_4$ represents a range in which it is memorized and held that the operation button is turned OFF during the slide elevating process. When the operation button is turned OFF after passing over 270° in the elevating process, this OFF confirmation signal is memorized and held up to 240° in the next stroke.

Based on a generation state of such four signals $P_1$ to $P_4$, the aforementioned overrun monitoring is performed for each one cycle of the slide operation, so that the safety at the time of slide actuation is guaranteed by assuming the brake performance normality to be a prerequisite for the next slide actuation. In the above, the monitoring result of overrunning is utilized as a data for judging that the brake performance was normal at the last operation, even when the slide is stopped during slide lowering process. As such, it is required to memorize the monitoring result until just before this result is reconfirmed in the slide elevating process. Thus, in the aforementioned conventional apparatus, there is used a fail-safe self-hold circuit for memorizing the monitoring result.

However, the aforementioned conventional operation apparatus for a press is constituted such that a part of the slide position signals for monitoring is utilized as information for controlling. As such, there is not separation between the controlling system for executing the operation control such as actuation/stopping of slide and the monitoring system for monitoring the functions for ensuring safety, and rather, the monitoring system is integrally incorporated into the controlling system. Thus, not only the monitoring system but also the whole of controlling system have been required to be constituted in a fail-safe manner, causing that the number of required slide position signals becomes numerous so that the constitution of controlling system is complicated.

SUMMARY OF THE INVENTION

The present invention has been carried out in view of the conventional problems as described above, and it is therefore an object of the present invention to provide an operation apparatus for a press, in which simplification and cost reduction of the apparatus are achieved by separating the controlling system and the monitoring system.

To this end, the operation apparatus for a press according to the present invention is constituted to comprise: a controlling system for generating a slide actuation command signal, and controlling actuation/stopping of a slide such that the slide actuation command signal is stopped at a predetermined timing; a monitoring system for monitoring as to whether the actuation/stopping controlling by the controlling system is normal or not, and for generating a slide actuation permission signal if normal; and an actuation signal generation device for generating a slide actuation signal based on input of the slide actuation command signal from the controlling system, only when the actuation signal generation device is input with the slide actuation permission signal from the monitoring system.

According to such a constitution, the controlling system and monitoring system can be constituted in a separated manner such that the controlling system controls the slide actuation/stopping of the press, while the monitoring system monitors as to whether the controlling operation of the controlling system is normal or not.

Concretely, the controlling system generates a slide actuation command signal based on an operation button ON operation by an operator, and stops the slide actuation command signal after the slide has transferred from a lowering process to an elevating process.

In such a constitution that the slide actuation command signal is generated based on the operation button ON operation, the monitoring system comprises: an actuation command OFF confirmation device for confirming as to whether or not the slide actuation command signal from the controlling system is stopped in the slide elevating process; and an operation button OFF confirmation device for confirming as to whether or not the operation button is turned OFF in the slide elevating process; and a logical product output of both confirmation devices is input, as the slide actuation permission signal, into the actuation signal generation device. Further, in addition to both confirmation devices, the monitoring system may further comprise an overrun confirmation device for confirming as to whether the slide is stopped within a predetermined range near the top dead center at the time of operation button ON operation.

According to such a constitution, there is generated a controlling actuation permission signal from the monitoring system when the operation button is turned OFF and the slide actuation command is turned OFF in the slide elevating process. Further, the slide actuation permission signal is generated from the monitoring system, by judging that the brake performance is normal, when it is confirmed that the slide has stopped near the top dead center.

The monitoring system may comprise: an overrun confirmation device for confirming as to whether or not the slide is stopping within a range of elevating process at the time a slide actuation command signal is generated; and the actuation command OFF confirmation device for confirming as to whether or not the slide actuation command signal from the controlling system is stopped in the slide elevating process; and a logical product output of both confirmation devices is input, as the slide actuation permission signal, into the actuation signal generation device.

Further, if the monitoring system is constituted to further comprise a signal resetting device for holding confirmation results of the confirmation devices during the slide lowering process, and for resetting the same at the slide elevating process; such confirmation results can be used as judging data for the controlling system at the time of the last operation, when the slide has stopped in the lowering process. Further, normality/abnormality of slide can be confirmed at each cycle of slide.

If the monitoring system is constituted to have an actuation command OFF earlier confirmation function for confirming, at a crank angle position before a top dead center, as to whether or not the slide actuation command signal of the controlling system has been stopped in the slide elevating process; it can be confirmed, before the top dead center, as to whether or not the automatic slide elevation has been stopped or not, so that the safety can be further improved.

Further, the constitution may be such that there is provided: a light-beam type safety apparatus provided with a plurality of optical curtains arranged serially in a carry-in direction of a work, on a boundary position of a danger zone including a bolster; and a direction detecting circuit for detecting entrance/escape of a human body into/from the danger zone, based on a state of output signal from the plurality of optical curtains, and the controlling system generates the slide actuation command signal based on a human body escape detection output from the direction detecting circuit and stops the slide actuation command signal after the slide has transferred from the lowering process to the elevating process.

According to such a constitution, it becomes possible to conduct an automatic slide operation requiring no operation button operations, by detecting the work carry-in operation of the operator by the direction detecting circuit based on the output of the light-beam type safety apparatus, and by regarding by means of the controlling system, as operation button ON, an escape detection output generated by the direction detecting circuit when the operator has escaped from the danger zone.

If the monitoring system is constituted in a fail-safe manner such that: the monitoring system generates an output of logical value "1" when judging that the controlling system is normal; and an output of logical value "0" when judging that the controlling system is abnormal or when the monitoring system itself fails; the slide actuation is never conducted in case of failure of the monitoring system, so that the safety and reliability can be further enhanced.

A position signal generating device for generating a first position signal in the slide elevating process and a second position signal in the slide lowering process, is constituted of two disks fixed to a crankshaft connected to the slide; each of the disks is provided with an optical sensor comprising a light emitting element and a light receiving element facing each other across the disk; and the optical sensor provided on one of the disks receives, by means of the light receiving element, a light from the light emitting element in the crank angle range corresponding to the slide elevating process to generate a light receiving signal, and the optical sensor provided on the other disk receives, by means of the light receiving element, a light from the light emitting element in the crank angle range corresponding to the slide lowering process to generate a light receiving signal, so that the light receiving signals from the respective optical sensors are made to be the first position signal and the second position signal, respectively.

DESCRIPTION OF THE PREFERRED EMBODIMENTS

There will be described hereinafter the preferred embodiments of the operation apparatus for a press according the present invention, with reference to the accompanying drawings.

Figure 1:
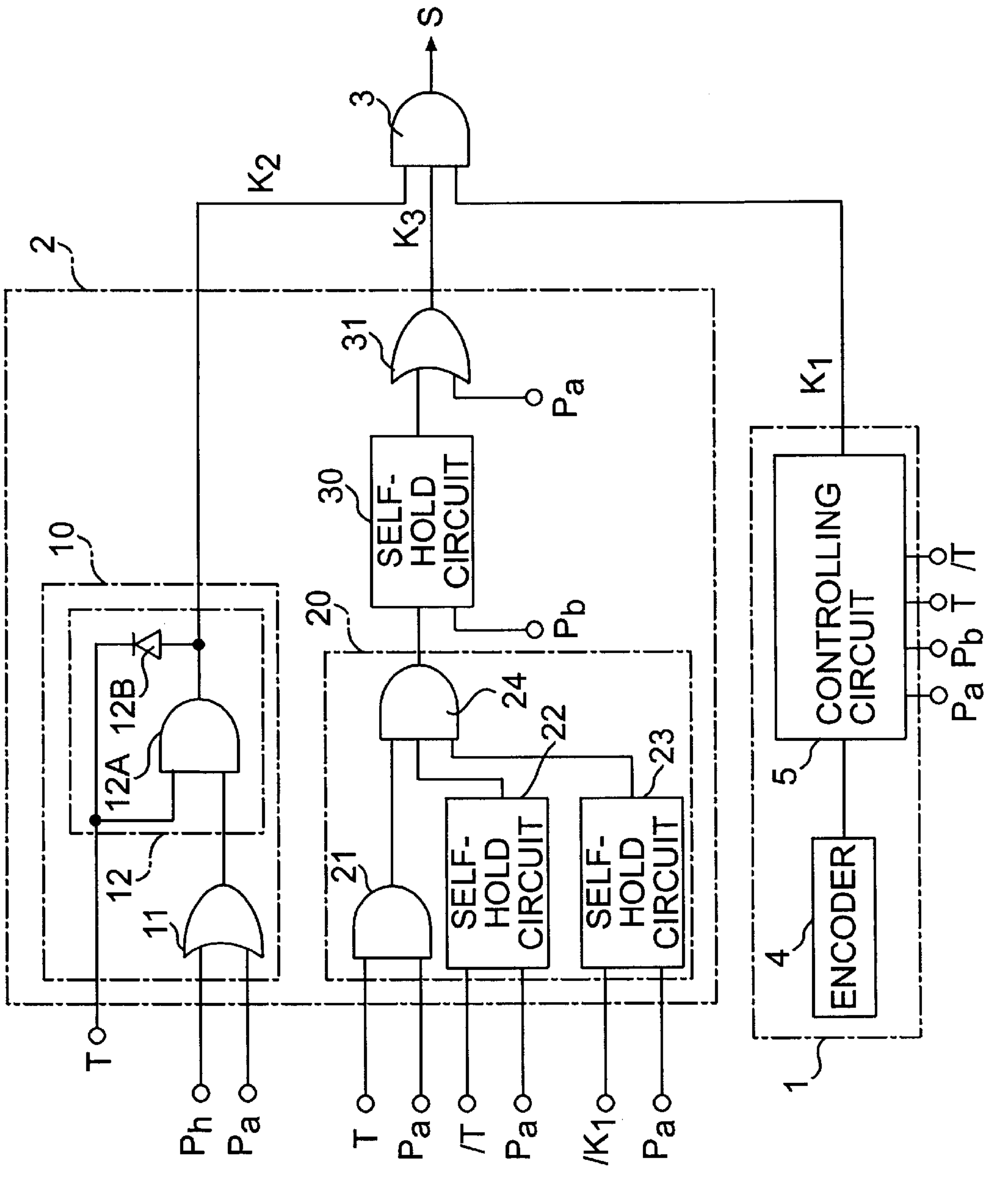
FIG. 1 is a constitutional view showing a first embodiment according to the present invention.

FIG. 1 is a constitutional block diagram of a first embodiment of the present invention.

This embodiment is applied to a crank press adopting a safe-one stroke operation in which the operation button is to be operated for each actuation of slide.

In FIG. 1, the operation apparatus of this embodiment is constituted of: a controlling system 1 for controlling the slide such as about its actuation, stopping, and moving speed; a monitoring system 2 for monitoring as to whether or not the operation control for the slide by the controlling system 1 is being normally conducted; a conventionally known fail-safe AND gate 3 functioning as actuation signal generation device which calculates logical product of an output signal from the monitoring system 2 and an output signal from the controlling system 1.

The controlling system 1 is constituted such as of: an encoder 4 for detecting the rotational angle of a crank which drives the slide; and a controlling circuit 5, which is constituted such as of a microcomputer, for controlling generation/stopping of a slide actuation command signal $K_1$, based on a crank-angle signal (slide position signal) from the encoder 4 and an ON/OFF signal from the operation button (in the drawings, "T" and "/T" indicate ON signal and OFF signal, respectively). To calibrate the slide position signal of the encoder 4, the controlling circuit 5 is also input with slide position signals $P_a$ and $P_b$ from a position signal generating apparatus 40 functioning as position signal generating device, which is to be later shown in FIG. 2 and detects previously set predetermined positions (15° and 180°, in terms of crank angle) of the slide.

The monitoring system 2 includes a re-activation prevention function (function to prevent the actuation of the slide insofar as the operation button is not operated by the operator after the slide has been once stopped). Further, the monitoring system 2 comprises: a first monitoring circuit 10 having a function as first monitoring device for monitoring the safety at the slide lowering, based on an output signal $P_h$ from a light-beam type safety apparatus (not shown) to be arranged at the danger-zone boundary part in front of a bolster, to thereby confirm the safety within the danger zone including the bolster; a second monitoring circuit 20 having a function as second monitoring device which includes monitoring functions such as an overrun monitoring function for confirming that the slide has stopped within the crank angle 15° (slide elevating process), a monitoring function for monitoring OFF of the operation button during the slide elevating process, and a monitoring function (monitoring function of automatic slide elevation OFF) for monitoring that a slide actuation command signal $K_1$ is turned OFF in the slide elevating process; a fourth self-hold circuit 30 functioning as signal resetting device for memorizing and holding a monitoring-result output (logical value "1") indicative of normality, output from the second monitoring circuit 20 in the slide lowering process, and for resetting this monitoring result output in the slide elevating process; and an OR gate 31 which is a second OR circuit for calculating logical sum of an output of the fourth self-hold circuit 30 and the position signal $P_a$ which becomes logical value "1" in the slide elevating process.

The first monitoring circuit 10 comprises: an OR gate 11 which is a first OR circuit for calculating logical sum of the output signal $P_h$ from the light-beam type safety apparatus and the first position signal $P_a$ indicative of the slide elevating process; and a first self-hold circuit 12 having a hold input terminal to which an output from the OR gate 11 is input and a trigger input terminal to which the ON signal T of the operation button is input. This first self-hold circuit 12 is constituted of a fail-safe AND gate 12A, and a diode 12B (typically including a resistor in series) which feeds back a rectified output of the AND gate 12A toward its trigger input terminal. Such a fail-safe self-hold circuit is already known such as from U.S. Pat. No. 5,285,721 mentioned above, and U.S. Pat. No. 5,027,114. Further, there has been known a fail-safe AND gate (fail-safe window comparator/AND gate) such as from Japanese Unexamined Patent Publication No. 60-68719, U.S. Pat. No. 5,027,114, and International Unexamined Patent Publication WO 94/23303. These elements are adapted to execute logical calculation by oscillation and to generate an output of direct current by rectification.

The second monitoring circuit 20 comprises: an AND gate 21 which is a first AND circuit for calculating logical product of the ON signal T of the operation button and the position signal $P_a$ to thereby generate an overrunning monitoring output; a second self-hold circuit 22 having a trigger input terminal to which the OFF signal /T of the operation button is input and a hold input terminal to which the position signal $P_a$ is input, to thereby generate an operation button OFF monitoring output; a third self-hold circuit 23 having a trigger input terminal to which a slide actuation command OFF signal $/K_1$ indicating that the slide actuation command signal $K_1$ of the controlling circuit 5 is turned OFF (stopped) is input, and a hold input terminal to which the position signal $P_a$ is input, to thereby generate an actuation command OFF monitoring output; and an AND gate 24 which is a second AND circuit for calculating logical product of the respective monitoring outputs from the AND gate 21 and both self-hold circuits 22 and 23. In the above, the self-hold circuits 22, 23 and 30 are constituted in the same manner with the first self-hold circuit 12.

There will be explained hereinafter how to generate the ON signal T and OFF signal /T both of the operation button, slide actuation command OFF signal $/K_1$, and the position signals $P_a$ and $P_b$.

The ON signal T and OFF signal /T of the operation button can be generated such as based on an operation button signal generating circuit described in U.S. Pat. No. 5,285,721 mentioned above, or based on Japanese Unexamined Patent Publication No. 6-84088. Such an operation button signal generating circuit is provided for the operation button having an ON contact of which contact point closes at the ON operation and an OFF contact of which contact point closes by spring-returning after ON operation; and each of the ON signal T and OFF signal /T of the operation button are output as logical value "1", by level testing the outputs from such contact points making use of associated window comparators, respectively. These ON signal T and OFF signal /T of the operation button are dual signals which never have logical value "1" simultaneously with each other.

The slide actuation command OFF signal $/K_1$ can be obtained by adopting an output of a current-zero detecting sensor conventionally known such as from U.S. Pat. No. 5,345,138, in which: the sensor detects the presence/absence of electric current in an output line of the slide actuation command signal $K_1$ of controlling circuit 5, and generates an output having logical value "1" in the absence of current (corresponding to actuation command OFF) and logical value "0" in the presence of flowing current.

Figure 2:
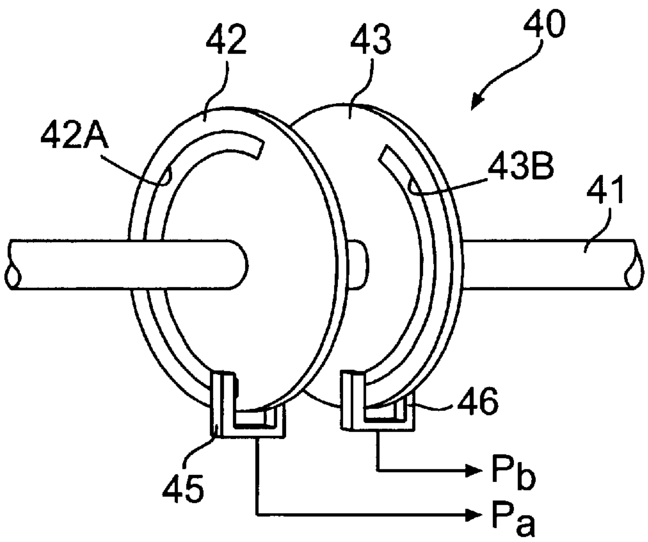
FIG. 2 is a constitutional view of an apparatus for generating position signals $P_a$ and $P_b$ to be applied to the present invention.

The position signals $P_a$ and $P_b$ may be generated such as by a position signal generating apparatus 40 utilizing photo-interrupters shown in FIG. 2.

Figure 3:
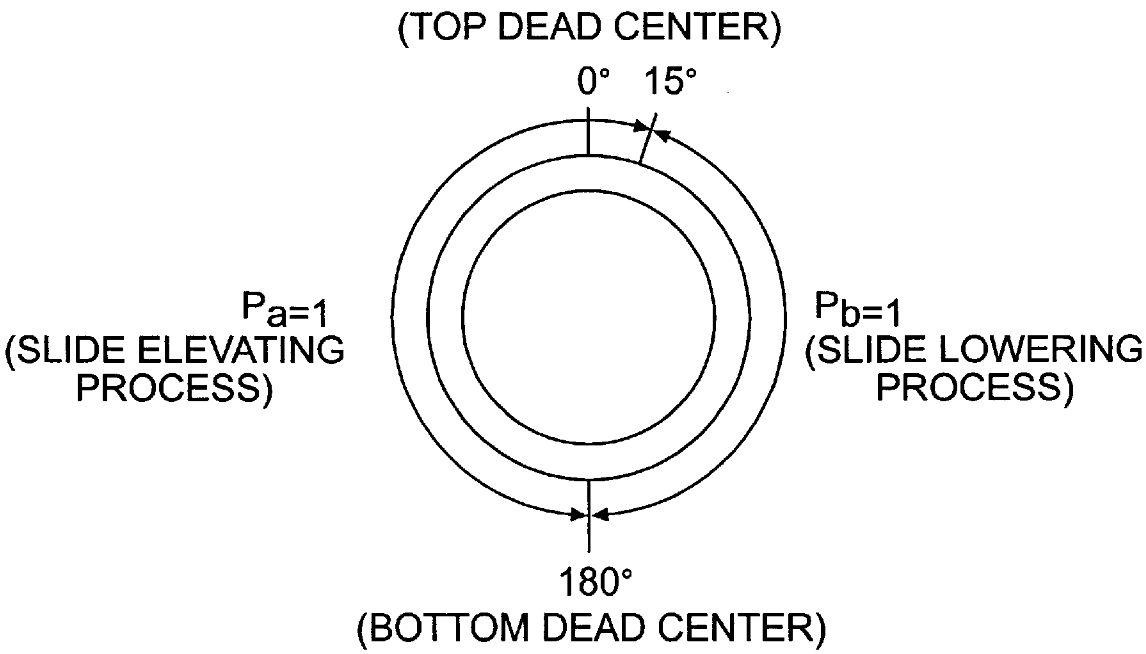
FIG. 3 is an explanatory view of relationship between the position signals $P_a$, $P_b$ and slide positions.

In FIG. 2, two disks 42, 43 are fixed to a crankshaft 41 connected to the slide. One disk 42 is formed with, near the periphery thereof, a slit 42A from a bottom dead center (180°) of crank angle to a predetermined angle after a top dead center (0°), such as, over a crank angle range from 180° to 15° (slide elevating process), and the other disk 43 is formed with, near the periphery thereof, a slit 43A from the predetermined angle after the top dead center to the bottom dead center, in this case over a crank angle range from 15° to 180° (slide lowering process). Further, there are provided photo-interrupters 45 and 46 for the moving loci of the slits 42A and 43A, respectively, each of which has a light emitting element and a light receiving element facing each other across one of disks 42 and 43. By such a constitution, as the crankshaft 41 rotates: in the range of crank angle from 180° to 15°, there is generated the first position signal $P_a$ having logical value "1" from the photo-interrupter 45 by the fact that the light receiving element of photo-interrupter 45 receives the light from the light emitting element of photo-interrupter 45 via slit 42A; and in the range of crank angle from 15° to 180°, there is generated the second position signal $P_b$ having logical value "1" from the photo-interrupter 46 by the fact that the light receiving element of photo-interrupter 46 receives the light from the light emitting element of photo-interrupter 46 via slit 43A. Namely, in this embodiment, as shown in FIG. 3, the crank angle range from 180° to 15° is assumed to be the slide elevating process so that the position signal $P_a$="1" is generated, and the crank angle range from 15° to 180° is assumed to be the slide lowering process so that the position signal $P_b$="1" is generated. In this case, there is frequently used in a fail-safe processing for a signal, such a method that the light signal from light emitting element is formed of alternating current light beam which is received by the light receiving element, and the alternating current light receiving signal from the light receiving element is rectified to obtain a binary value signal (logical value "1" and logical value "0") (see, for example, U.S. Pat. No. 5,345,138).

There will be described hereinafter the operation of this embodiment.

When the operator has turned ON the operation button so that the ON signal T of operation button is input, the slide actuation command signal $K_1$ is generated by the controlling circuit 5. If the press is normal, all of the output signals $K_2$ and $K_3$ from the monitoring system 2 become to have logical value "1". Thus, the generation of slide actuation command signal $K_1$ from the controlling circuit 5 causes a slide actuation signal S to be generated from the AND gate 3, so that the slide starts lowering.

When the slide has passed through the crank angle 15° to thereby enter the lowering process, the position signal $P_a$ disappears. Instead, there is generated the slide position signal $P_b$ having logical value "1" indicative of the slide lowering process. By the generation of this slide position signal $P_b$, the output of logical value "1" from the AND gate 24 input into the self-hold circuit 30 is held during the lowering process. As such, the output signal $K_3$ of the OR gate 31 is held at logical value "1". Further, if the safety of bolster is guaranteed in the slide lowering process, the monitoring signal $K_2$ of first monitoring circuit 10 is held at logical value "1", by the output signal $P_h$ from the light-beam type safety apparatus. Thus, the slide actuation signal S is kept generated during the lowering process, so that the lowering operation is continued. Further, by the disappearance of the position signal $P_a$, all of the outputs of AND gate 21 and self-hold circuits 22, 23 disappear, so that the overrun monitoring result, OFF confirmation of operation button, and confirmation of actuation command stop are reset, resulting in resetting of all of the monitoring results by the second monitoring circuit 20.

When the slide has passed through the bottom dead center (crank angle 180°) to enter the elevating process, the slide position signal $P_b$ from the photo-interrupter 46 disappears so that the output of the self-hold circuit 30 disappears. At this time, however, there is generated the position signal $P_a$ of logical value "1" from the photo-interrupter 45, so that the output signal $K_3$ of OR gate 31 is kept unchanged, at logical value "1". Thereafter, when the slide actuation command signal $K_1$ of controlling circuit 5 is normally stopped, the slide actuation command OFF signal $/K_1$ is generated and the OFF signal /T of operation button is generated, in the slide elevating process in which the position signal $P_a$ has logical value "1", the monitoring outputs having logical value "1" from the self-hold circuits 22, 23 are generated again and held until disappearance of the position signal $P_a$ (i.e., until transference to the slide lowering process). Then, if the brake performance is normal, the slide is stopped within a range of crank angle 15° and the position signal $P_a$ is kept at logical value "1".

Under this condition, when the operator turns ON the operation button for the next slide actuation to thereby generate the operation button ON signal T, the overrunning monitoring output from the AND gate 21 becomes logical value "1" indicative of normality, since the position signal $P_a$ has logical value "1". As a result of the above, there is generated an output of logical value "1" from the AND gate 24. Further, at the time the slide enters the lowering process, the output of logical value "1" of AND gate 24 is memorized and held by the self-hold circuit 30, by virtue of the output of slide position signal $P_b$ having logical value "1", so that an output of logical value "1" is generated from the self-hold circuit 30.

As described above, the output signal $K_3$ of the OR gate 31 continuously keeps logical value "1" insofar as the press is normally operating, and the monitoring signal $K_2$ of the first monitoring circuit 10 also continuously keeps logical value "1" insofar as the safety at the time of slide lowering is guaranteed. As such, the slide operation can be executed, whenever the slide actuation command signal $K_1$ is generated from the controlling circuit 5 based on the operation of operation button by the operator. Further, those output signals of overrun monitoring of slide, OFF confirmation of operation button, and OFF confirmation of actuation command are reset by transference to the elevating process of slide, and are confirmed at each cycle of the slide.

In the circuit of FIG. 1, if the slide actuation command signal was not turned OFF such as by failure of controlling circuit 5, the monitoring output of self-hold circuit 23 never becomes to have logical value "1". Further, the monitoring output of second self-hold circuit 22 does not become logical value "1", unless the operation button is turned OFF. In addition, such as due to deterioration of brake performance, if the slide has overrun the crank angle 15° and stopped beyond the same irrespectively of the fact that the actuation command and operation button have been normally turned OFF, the output of logical value "1" of position signal $P_a$ will disappear. In this case, the output of AND gate 21 does not become logical value "1", even if the operation button is turned ON. Thus, in such an abnormal condition, the monitoring output of second monitoring circuit 20 (i.e., output of AND gate 21) never becomes logical value "1", so that the slide actuation signal S is never generated. Also during the slide lowering, when the output signal $P_h$ of light-beam type safety apparatus has become logical value "0" by detecting a foreign matter, the output signal $K_2$ of first monitoring circuit 10 becomes logical value "0" so that the slide actuation signal S is immediately stopped to thereby stop the slide lowering. In case that the slide is stopped during the slide lowering, the output signal $K_2$ of first monitoring circuit 10 does not become logical value "1" unless the operation button ON signal T is generated by the ON operation of operation button by the operator, so that the slide can not be actuated.

According to the press having such a constitution, the controlling system 1 and monitoring system 2 are separated from each other, such that: the controlling system 1 controls the actuation/stopping of the slide; while, such as based on those signals indicative of output state of controlling system 1, operating state of operation button, and distinction between elevating process and lowering process of slide, the monitoring system 2 dedicatedly monitors as to whether the slide actuation by the controlling system 1 is normal or not. Thus, the position signals of slide which are used in the operation system can be satisfied by the position signals $P_a$ and $P_b$, so that the number of position signals to be used can be reduced as compared to the conventional, resulting in simplification and reduced cost of the constitution of operation apparatus for a press.

Further, by resetting the monitoring result of the monitoring circuit 20 in elevating process, the operation of controlling system 1 is confirmed at each cycle of slide operation, so that the slide can be actuated based on the latest monitoring result, thereby further improving the safety.

Further, once the slide has been emergently stopped, the slide can not be actuated unless the operator positively operates the operation button. Thus, the safety of operator can be enhanced.

Moreover, the monitoring system is constituted in such a fail-safe manner that its output becomes logical value "0" in case of failure. Thus, when abnormality has occurred even in the monitoring system itself, the slide actuation is forcibly stopped so that the operation apparatus for press is made to be extremely superior in safety.

Figure 4:
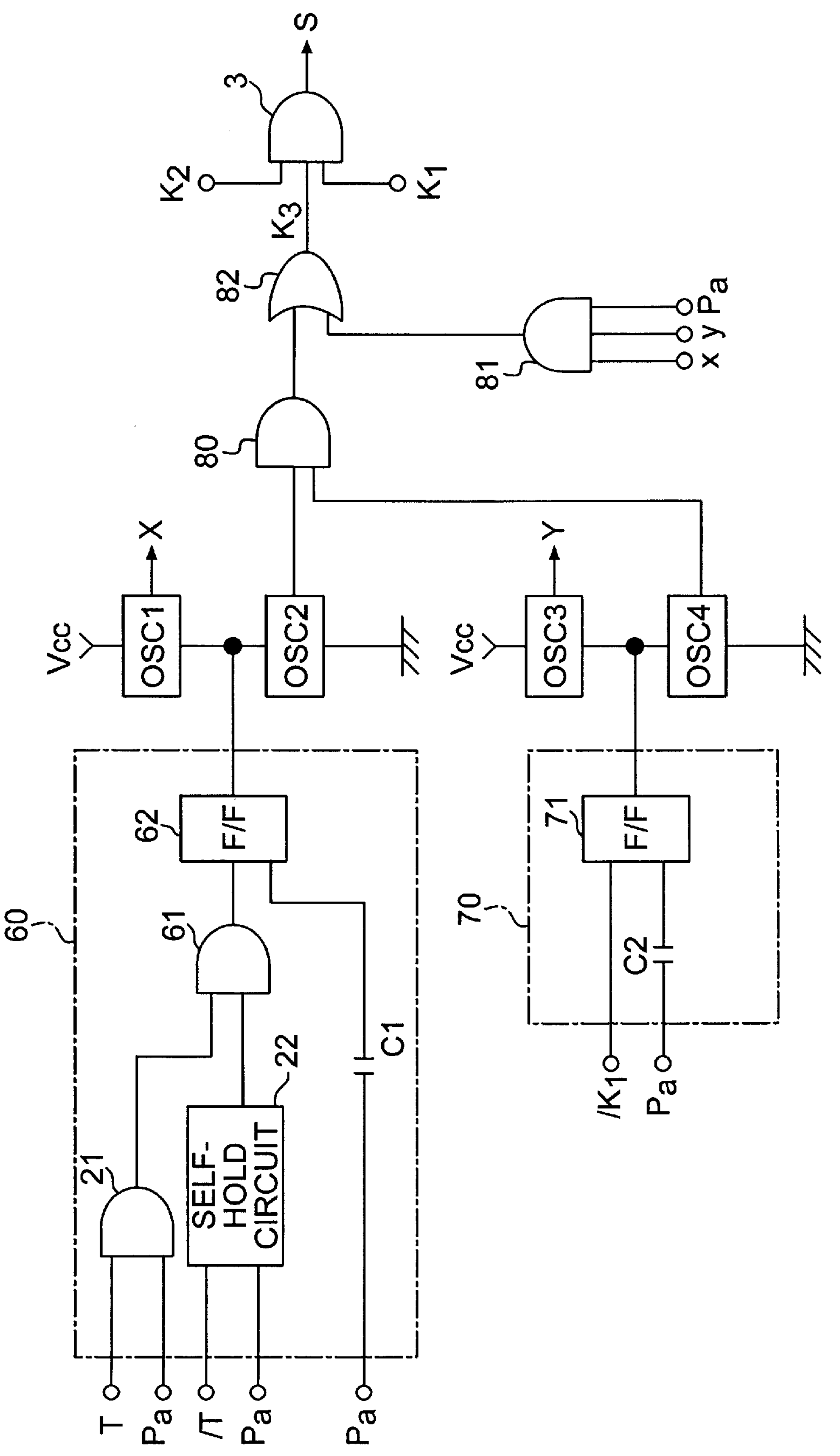
FIG. 4 is a constitutional view showing a second embodiment according to the present invention.

Shown in FIG. 4 is a second embodiment of the present invention adopting flip-flop circuits as the monitoring circuits. In the second embodiment of FIG. 4, since the controlling system 1 has a constitution same as that of the first embodiment of FIG. 1, while the monitoring system has a different constitution, only the constitution of monitoring system is depicted in FIG. 4 and will be described hereinafter. In the monitoring system of this embodiment, the first monitoring circuit, inclusive of the re-activation prevention function, for monitoring the safety during the slide lowering is identical with that of first embodiment, so that the depiction thereof is omitted in FIG. 4. Further, those parts identical with the constitution of the first embodiment are designated by the identical numerals, and the explanation thereof is omitted.

In FIG. 4, the monitoring system of this embodiment is constituted of, in addition to the first monitoring circuit 10 (shown in FIG. 1): a monitoring part 60 as a first monitoring part for conducting overrun monitoring and operation button OFF confirmation; a monitoring part 70 as a second monitoring part for confirming OFF of slide actuation command signal; four oscillators OSC1 to OSC4 functioning as first through fourth oscillating devices; an AND gate 80 which is a fourth AND circuit for calculating logical product of the outputs of the oscillator OSC2 and oscillator OSC4; an AND gate 81 which is a fifth AND circuit to be described later, an OR gate 82 which is a third OR circuit for calculating logical sum of both outputs of AND gates 80 and 81.

The monitoring part 60 comprises: an AND gate 61 which is a third AND circuit for calculating logical product of the output of AND gate 21 which generates the monitoring output of overrunning and the output of second self-hold circuit 22 which generates the operation button OFF monitoring output; and a first flip-flop circuit 62 (hereinafter referred to as first F/F circuit) having the output of AND gate 61 as a set input thereof and a leading-edge differential signal ($dP_a/dt>0$) of the position signal $P_a$ indicative of the elevating process of slide as a reset input thereof. C1 is a capacitor.

The monitoring part 70 comprises a second F/F circuit 71 having the slide actuation command OFF signal $/K_1$ as a set input thereof and a leading-edge differential signal ($dP_a/dt>0$) of the position signal $P_a$ indicative of the elevating process of slide as a reset input thereof. C2 is a capacitor.

The oscillator OSC1 is connected between the constant voltage $V_{cc}$ line and an output end of the first F/F circuit 62, and the oscillator OSC2 is connected between the output end of the first F/F circuit 62 and the ground. Similarly, the oscillator OSC3 is connected between the constant voltage $V_{cc}$ line and an output end of the second F/F circuit 71, and the oscillator OSC4 is connected between the output end of the second F/F circuit 71 and the ground. As such, the oscillators OSC1 and OSC3 will oscillate when the outputs of the respective F/F circuits 62 and 71 are at a low level (reset state), respectively, while the oscillators OSC2 and OSC4 will oscillate when the outputs of the respective F/F circuits 62 and 71 are at a high level (set state), respectively. In this respect, it is well known to generate a desired output level, by using an output signal of a typical circuit such as F/F circuit, as a driving power source of an oscillator, and by rectifying the output signal of such an oscillator. Accordingly, there are used the oscillators for connecting the F/F circuits and the fail-safe AND gate. It is noted that the oscillators OSC1 to OSC4 include rectifying circuits, respectively, but the depiction thereof is omitted in the drawing. Apparently, this method can be applied to the slide actuation command signal $K_1$ and slide actuation command OFF signal $/K_1$ of the controlling circuit 5 in FIG. 1.

The AND gate 81, which is a fifth AND circuit, is provided for confirming that the F/F circuits 62 and 71 have been reset, and calculates logical product of output signals x, y of oscillators OSC1, OSC3 and the position signal $P_a$.

There will be described hereinafter the operation of this embodiment.

When the slide has transferred from the lowering process to the elevating process, there is generated the position signal $P_a$ having logical value "1" to thereby reset the F/F circuits 62 and 71. Thereafter, the F/F circuit 62 in the monitoring part 60 is set, when the output of AND gate 61 becomes logical value "1" by the generation of the operation button OFF signal /T and operation button ON signal T. When an output of high-level is generated by setting the F/F circuit 62, the oscillator OSC2 generates an output. Meanwhile, when the slide actuation command OFF signal $/K_1$ is generated, the F/F circuit 71 in the monitoring part 70 is set, so that the oscillator OSC4 generates an output. Accordingly, if the press is normally operating, an output of AND gate 80 becomes logical value "1", by the rectified outputs from the oscillators OSC2, OSC4 based on the set outputs from the F/F circuits 62 and 71, so that an output signal $K_3$ of OR gate 82 becomes logical value "1". Thus, with generation of the slide actuation command signal $K_1$ from the controlling system, the slide actuation signal S is generated via AND gate 3, since the output signal $K_2$ of the first monitoring circuit 10 shown in the first embodiment has logical value "1" insofar as the safety in the danger zone is guaranteed. Further, when the F/F circuits 62 and 71 are reset by the generation of the position signal $P_a$ due to transference of the slide to the elevating process, there are generated outputs from the oscillators OSC1, OSC3, respectively, so that the output of AND gate 81 becomes logical value "1", resulting in that the output of OR gate 82 is kept at logical value "1".

In the circuit of FIG. 4, the F/F circuit 71 is not set, when the slide actuation command signal K, is not turned OFF after the F/F circuits 62 and 71 have been normally reset. Further, the output of AND gate 61 does not become logical value "1" and therefore the F/F circuit 62 is not set, such as in case that the operation button has not been turned OFF or that the slide has overrun the crank angle 15° and stopped at a position beyond the same. In such a situation, the output signal $K_3$ of OR gate 82 disappears, so that the slide actuation signal S is not generated.

In this embodiment, the automatic elevation of slide is not permitted unless the F/F circuits 62 and 71 are in the reset states, and the slide lowering is not permitted unless the F/F circuits 62 and 71 become set states, respectively.

Figure 5:
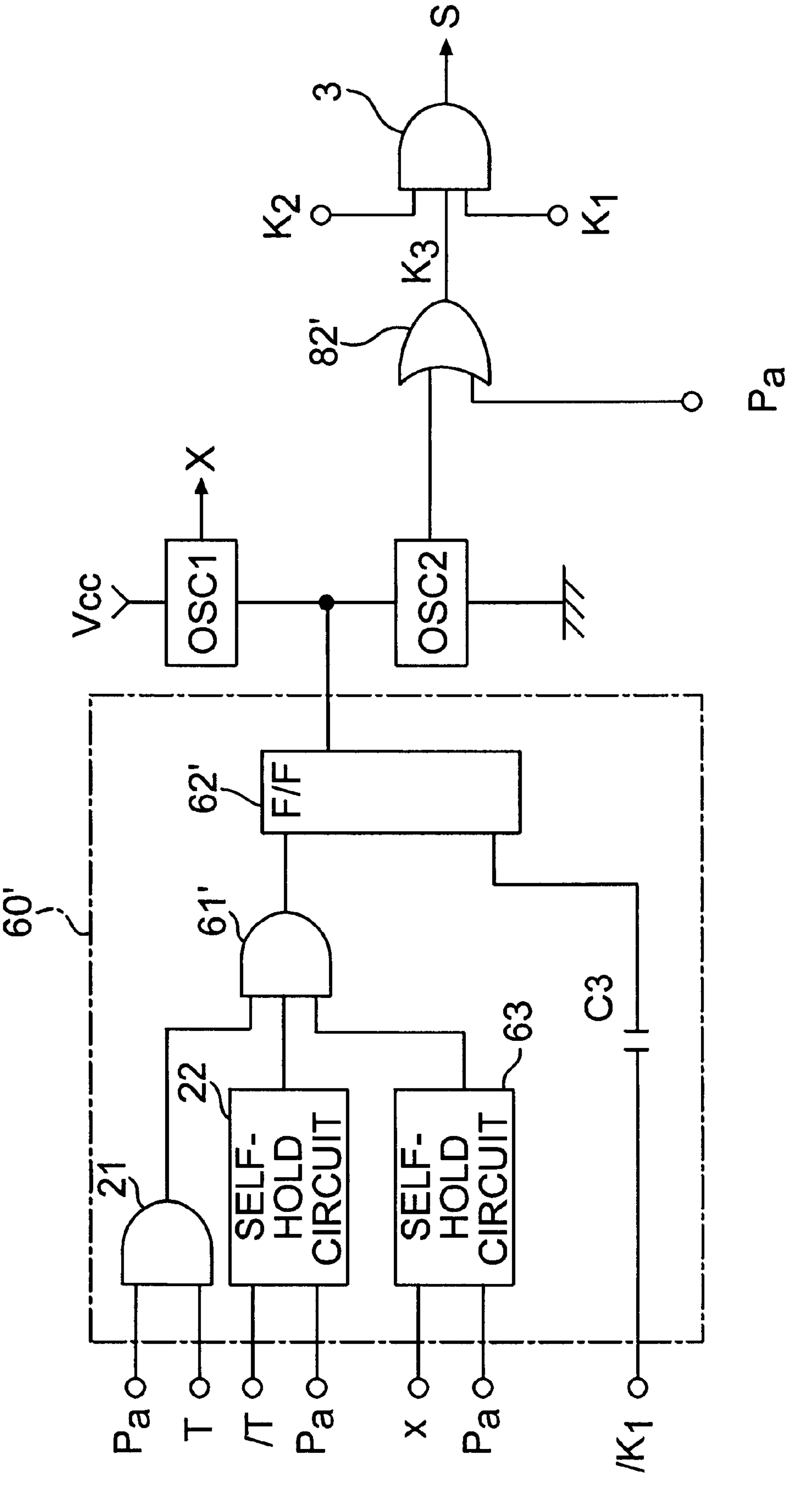
FIG. 5 is a constitutional view showing a third embodiment according to the present invention.

FIG. 5 shows a third embodiment of the present invention.

This embodiment is provided in a simplified form having only one of the F/F circuits of FIG. 4.

In FIG. 5, a monitoring part 60' as a third monitoring part of this embodiment includes the AND gate 21 and self-hold circuit 22 so as to have a function same as that of the monitoring part 60 of FIG. 4. However, its constitution additionally includes a fifth self-hold circuit 63 having a trigger input terminal to which the output of the oscillator OSC1 functioning as fifth oscillating device is input, and a hold input terminal to which the position signal $P_a$ is input, so that this circuit 63 memorizes and holds, during the slide elevating process, that a F/F circuit 62' has been reset. The output signal of this fifth self-hold circuit 63 is input to an AND gate 61' which is a sixth AND circuit. Further, the F/F circuit 62' as a third F/F circuit is constituted to be reset by a leading-edge differential signal of the slide actuation command OFF signal $/K_1$. Yet further, an OR gate 82', which is a fourth OR circuit, generates the output signal $K_3$ by calculating logical sum of the output of oscillator OSC2 functioning as sixth oscillating device, and the position signal $P_a$. The self-hold circuit 63 has a fail-safe constitution identical with that of the self-hold circuit 22. C3 is a capacitor. Similarly to FIG. 4, the controlling system 1 and the first monitoring circuit 10 having the re-activation prevention function and monitoring the safety at the time of slide lowering are identical with those of the first embodiment, so that they are omitted.

In such a constitution, upon generation of the slide actuation command OFF signal $/K_1$ by the transference of slide into the elevating process, the leading-edge differential signal thereof resets the F/F circuit 62'. Then, the output x is generated from the oscillator OSC1, and is memorized and held by the self-hold circuit 63 during the slide elevating process and input into the AND gate 61'. Thus, the output of AND gate 61' becomes logical value "1" to thereby set the F/F circuit 62', only when the generation of the slide actuation command OFF signal $/K_1$ is confirmed, operation button OFF is confirmed by the output of the self-hold circuit 22 and the slide has not overrun so that the operation button is turned ON under an appropriate condition of the brake performance. As a result, the output signal $K_3$ having logical value "1" is input into the AND gate 3 via oscillator OSC2 and OR gate 82', so that the slide actuation is enabled.

Figure 6:
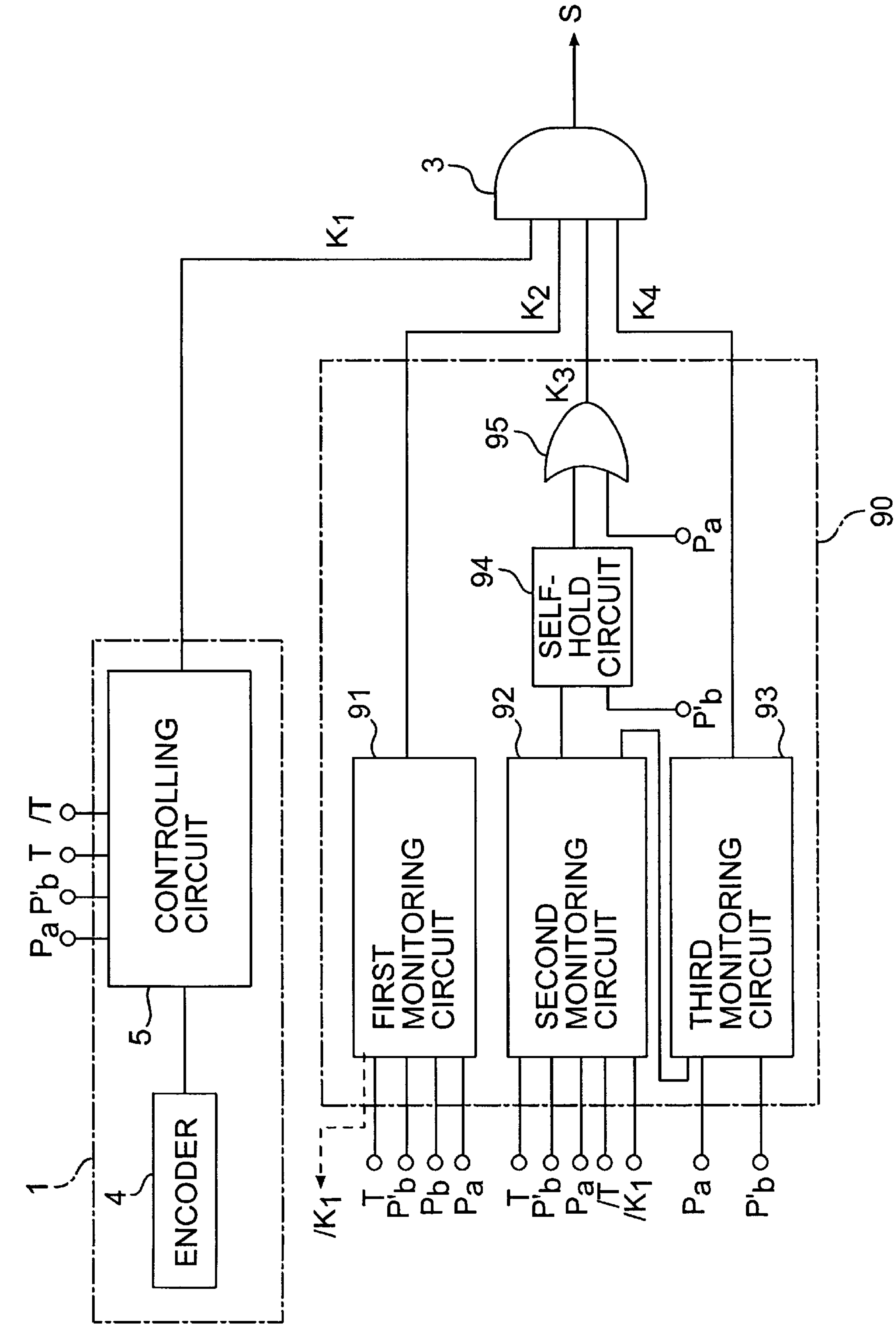
FIG. 6 is a block diagram showing a fourth embodiment according to the present invention.

FIG. 6 shows a fourth embodiment according to the present invention.

This embodiment is to confirm the stopping of slide actuation command signal $K_1$, in an earlier stage. In the circuits of the aforementioned first through third embodiments, there remains such a possibility that the generation of slide actuation command OFF signal $/K_1$ can not be confirmed, until the maximum crank angle 15° in the slide elevating process (from 180° to 15°). Taking into consideration slippage of slide in a range from actuation of brake up to stoppage of slide, confirmation in an earlier stage may be desirable. The fourth embodiment of FIG. 6 is constituted to be capable of confirming the slide actuation command OFF signal $/K_1$, in an earlier stage.

FIG. 6 shows a schematic block diagram of this embodiment. Those parts identical with FIG. 1 are designated by the identical numerals, and the explanation thereof is omitted.

In FIG. 6, a monitoring system 90 of this embodiment is constituted of: a monitoring circuit 91 as third monitoring device, which includes a re-activation prevention function, and which, based on the output signal $P_h$ of the light-beam type safety apparatus, immediately stops the slide when a dangerous state has occurred during the slide lowering; a monitoring circuit 92 as fourth monitoring device having an overrun monitoring function, an operation button OFF monitoring function in the slide elevating process, and an OFF monitoring function for the slide actuation command signal $K_1$ in the slide elevating process; a monitoring circuit 93 as fifth monitoring device for confirming the automatic elevation OFF of the slide, in an earlier stage; a ninth self-hold circuit 94 for memorizing and holding the monitoring result output from the monitoring circuit 92 indicative of the normality, during the slide lowering process; and an OR gate 95 which is a seventh OR circuit for calculating logical sum of the output of ninth self-hold circuit 94 and the position signal $P_a$. The AND gate 3 is input with the slide actuation command signal $K_1$ of the controlling system, the output signal $K_2$ of monitoring circuit 91, the output signal $K_3$ of OR gate 95, and an output signal $K_4$ from the monitoring circuit 93.

Figure 7:
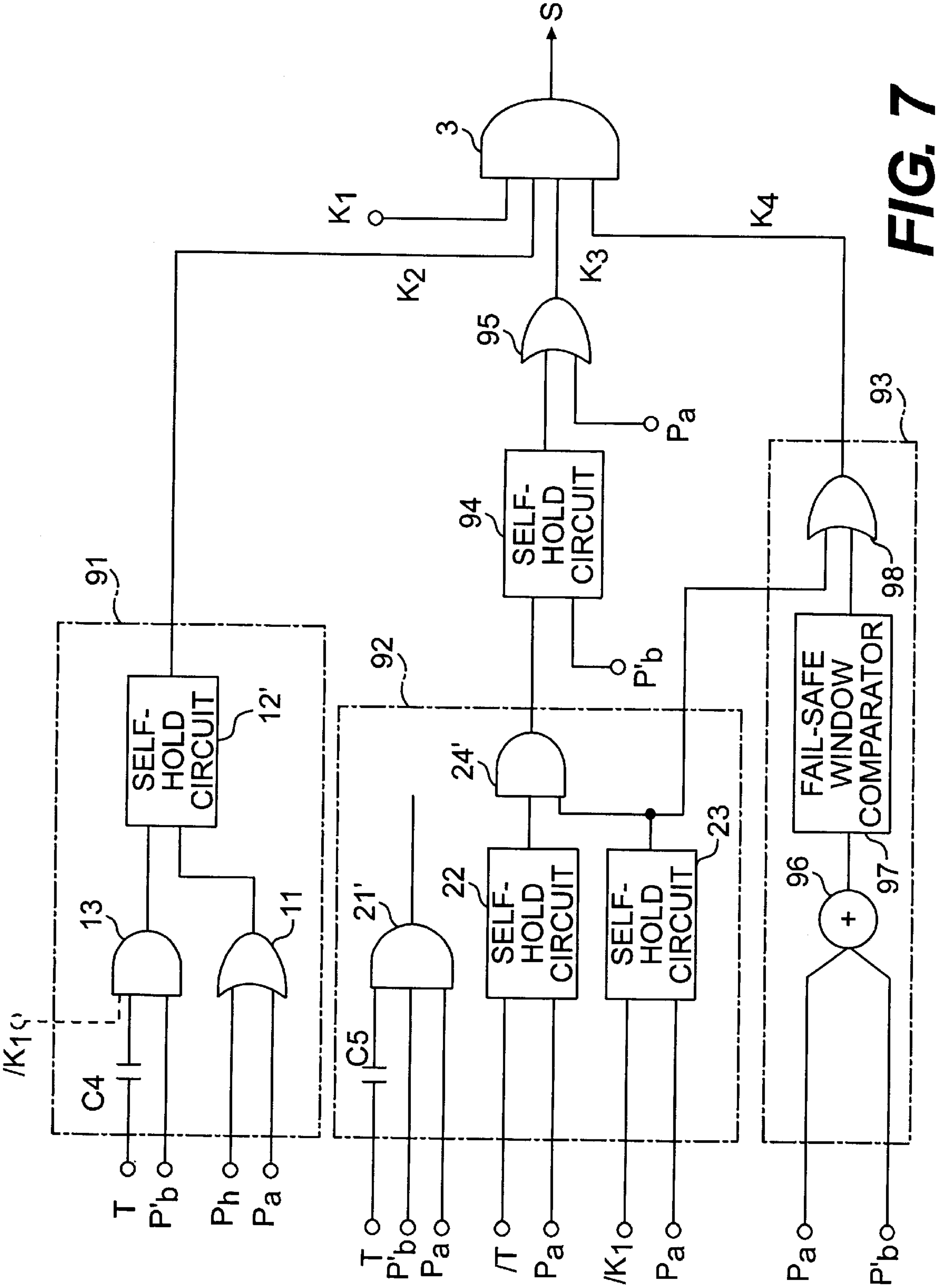
FIG. 7 is a constitutional view concretely showing details of FIG. 6.

FIG. 7 shows a concrete constitution of the monitoring system 90.

In FIG. 7, the monitoring circuit 91 includes, in addition to the OR gate 11 functioning as the fifth OR circuit of FIG. 1 and a sixth self-hold circuit 12', an AND gate 13 which is a seventh AND circuit for performing a logical-product calculation of a leading-edge signal of operation button ON signal T and the position signal $P_b'$ indicative of slide lowering process in which the output of the AND gate 13 is input into a trigger input terminal of a sixth self-hold circuit 12'. C4 is a capacitor for detecting a leading edge of the ON signal of operation button.

The monitoring circuit 92 is constituted of: an AND gate 21' which is an eighth AND circuit; self-hold circuits 22, 23 functioning as seventh and eighth self-hold circuits; and an AND gate 24' which is a ninth AND circuit. The AND gate 21' is additionally input with the position signal $P_b'$ indicative of the slide lowering process. C5 is a capacitor for detecting a leading edge of the ON signal T of operation button.

The monitoring circuit 93 is constituted of: an adding circuit 96 for adding the position signal $P_a$ indicative of slide elevating process and the position signal $P_b'$ indicative of slide lowering process; a fail-safe window comparator 97 for threshold-value calculating the output of the adding circuit 96; and an OR gate 98 which is a sixth OR circuit for calculating logical sum of the output of window comparator 97 and the output of self-hold circuit 23 of monitoring circuit 92; in which the output signal $K_4$ of OR gate 98 is input to the AND gate 3.

Figure 8:
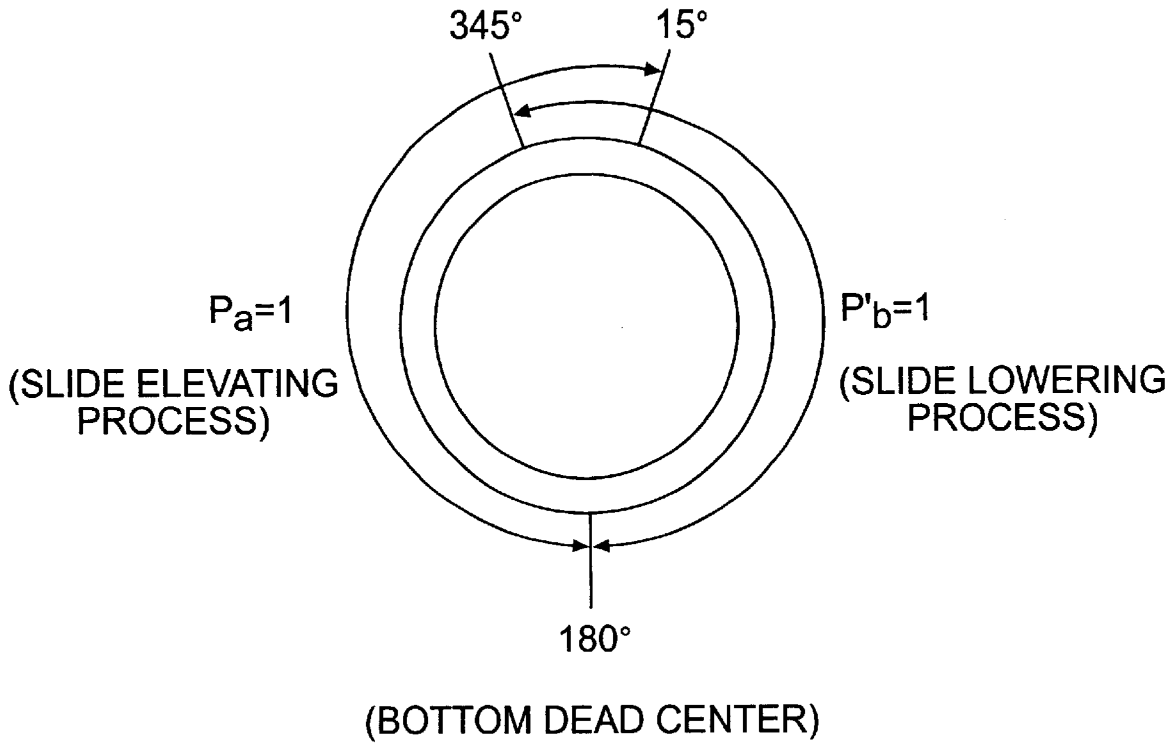
FIG. 8 is an explanatory view of relationship between the position signals $P_a$, $P_b$ and the slide positions, to be applied to the embodiment of FIG. 6.

In case of this embodiment, the output range of logical value "1" of the position signal $P_b'$ indicative of the slide lowering process is widened up to a predetermined angle before the top dead center (0°), such as to a crank angle 345°, such that the slide actuation signal OFF can be confirmed before the maximum crank angle 345°, as shown in FIG. 8. Thus, in this embodiment, both of the position signal $P_a$ indicative of slide elevating process and the position signal $P_b'$ indicative of slide lowering process have logical value "1", in the crank angle range from 345° to 15°.

As such, the adding circuit 96 of monitoring circuit 93 generates an output having a level corresponding to logical value "2" when both of position signals $P_a$ and $P_b'$ have logical value "1", generates an output of logical value "1" when only one of them has logical value "1", and generates an output having a level corresponding to logical value "0" when both of them have logical value "0". Further, the window comparator 97 generates an output of logical value "1" only when the output of adding circuit 96 has logical value "1" and an output of logical value "0" when the output of adding circuit 96 has logical value "2" or logical value "0". Such a fail-safe window comparator is known such as from the aforementioned U.S. Pat. No. 5,345,138, and International Unexamined Patent Publication WO 94/23303.

In such a constitution, there is judged normality only when the slide has stopped within the rage of crank angle from 345° to 15°, such that the slide actuation signal S is output based on the slide actuation command signal $K_1$ from controlling system 1 thereby enabling the next slide operation.

In the monitoring circuit 93, the output of window comparator 97 becomes to have logical value "0", when both position signals $P_a$ and $P_b'$ become logical value "1". Namely, the output of window comparator 97 becomes to have logical value "0", after the slide has passed over the crank angle 345° in the slide elevating process. Thus, when the slide actuation command OFF signal $/K_1$ can be confirmed before the crank angle 345°, the output signal $K_4$ of OR gate 98 is held at logical value "1" even after the crank angle 345°, by the output of self-hold circuit 23 of monitoring circuit 92. However, when the generation of slide actuation command OFF signal $/K_1$ has not been confirmed by the time that the slide passes over the crank angle 345°, the output signal $K_4$ of OR gate 98 becomes logical value "0", thereby causing the slide actuation signal S to disappear so that the slide actuation is stopped.

According to the fourth embodiment described above, the OFF confirmation of automatic slide elevation can be effected at the crank angle 345° before the top dead center, at the latest. Thus, the slide can be stopped at an earlier stage such as in case that the slide should be forcibly stopped clue to failure of OFF confirmation of automatic slide elevation, thereby further improving the safety.

Meantime, in each of the above embodiments, if the slide actuation command signal $K_1$ from the controlling system 1 has been previously generated though the operation button is not pushed, the ON operation of operation button (T=1) will cause immediate generation of the slide actuation signal S.

To avoid this, it is desirable to monitor the generation timing of slide actuation command signal $K_1$ of controlling system 1.

To this end, it is advisable to input the slide actuation command OFF signal $/K_1$ into the AND gate 13 of monitoring circuit 91, such as shown in each of FIGS. 6 and 7 by a dotted line. According to such a constitution, the slide actuation signal S is generated, only when the slide actuation command signal $K_1$ is generated after generation of ON signal T=1 of operation button. In a state that the slide actuation command signal $K_1$ is kept generated without being turned OFF, the output of self-hold circuit 23 of FIG. 7 is not generated so that the slide actuation signal S can be never generated. Similar procedure may be applied to the embodiments shown in FIGS. 1, 4 and 5. In case of these embodiments, it is advisable to provide the first monitoring circuit 10 of FIG. 1 with an AND gate for calculating logical product of the operation button ON signal T and the slide actuation command OFF signal $/K_1$ and to input the output of such an AND gate into the trigger input terminal of self-hold circuit 12.

There will be described hereinafter a fifth embodiment of the present invention, which is constituted such that the slide actuation is automatically conducted, by detecting the escaping direction of operator's hand based on the generating state of ON/OFF signal of the light-beam type safety apparatus (optical curtain) and confirming the work carry-in operation, while omitting an operation button. The basic procedure for constituting a fail-safe optical sensor is described in the aforementioned U.S. Pat. No. 5,345,138. Concrete fail-safe optical sensors include those fail-safe sensors, such as of International Unexamined Patent Publication Nos. WO 93/23772 and WO 95/10789, connectable to a direction detecting circuit of FIG. 11.

Figure 9:
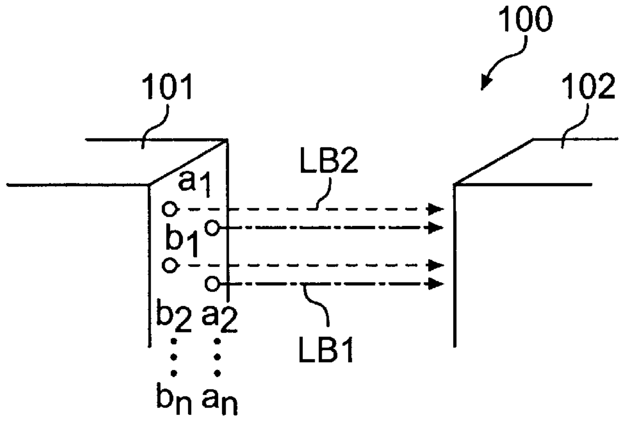
FIG. 9 is a constitutional view of an essential part of a light-beam type safety apparatus applied to a fifth embodiment of the present invention.
Figure 10:
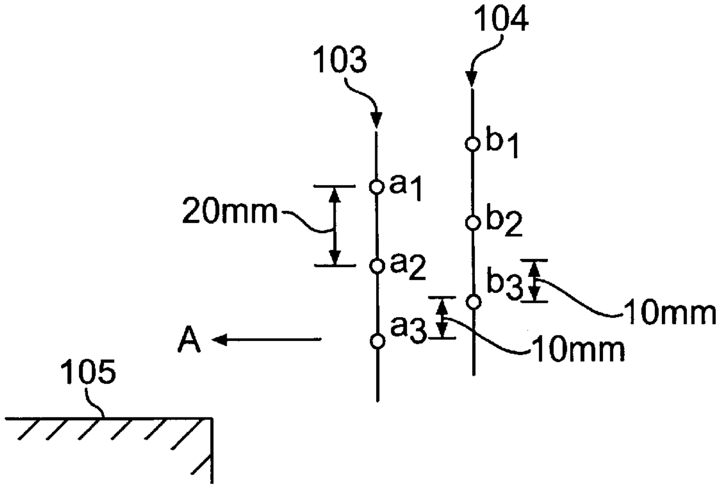
FIG. 10 is an explanatory view of arrangement of optical curtain adopted in the light-beam type safety apparatus of FIG. 9.

Referring first to FIGS. 9 and 10, there will be described hereinafter a light-beam type safety apparatus 100 of this embodiment, provided instead of an operation button.

In FIGS. 9 and 10, the light-beam type safety apparatus 100 of this embodiment is provided with: a light emitter 101 and a light receiver 102 opposing to each other and arranged on a boundary position in front of a bolster 105 of the press; and a plurality of optical curtains such as double optical curtains 103, 104 arranged serially in the carry-in direction (depicted by an arrow A in FIG. 10) of a work. Namely, the light emitter 101 is provided with, in a vertical arranging direction in the drawing, a number of light emitting elements $a_1, a_2, \ldots$, which form the optical curtain 103 closer to the bolster 105 side, and a number of light emitting elements $b_1, b_2, \ldots$, which form the optical curtain 104 closer to the operator side. Although not shown, the light receiver 102 is also provided with a number of light receiving elements corresponding to the respective light emitting elements $a_1, a_2, \ldots$ and $b_1, b_2, \ldots$ As shown in FIG. 10, the respective intervals of light axes $LB_1$ and $LB_2$ of the optical curtains 103, 104 are set such as at 20 mm, and the light axes $LB_1$ of optical curtain 103 and the light axes $LB_2$ of optical curtain 104 are arranged in a manner offset from each other by 10 mm in the vertical direction, i.e., in a staggered manner. According to such an arrangement, the light axes of the light-beam type safety apparatus 100 exist with a substantially 10 mm intervals when viewed from the front, so that the number of light emitting elements and light receiving elements can be reduced to a half, resulting in cost reduction of the light-beam type safety apparatus, as compared to such a case that the light axes $LB_1$ and $LB_2$ of optical curtains 103 and 104 are arranged with 10 mm intervals, respectively.

There will be described hereinafter, with reference to FIG. 11, an example of a conventionally known direction detecting circuit (see, for example, Japanese Unexamined Patent Publication No. 61-38825, and the aforementioned U.S. Pat. No. 5,027,114) for detecting the escaping direction of the operator's hand, based on the output signals of both optical curtains 103, 104.

Figure 11:
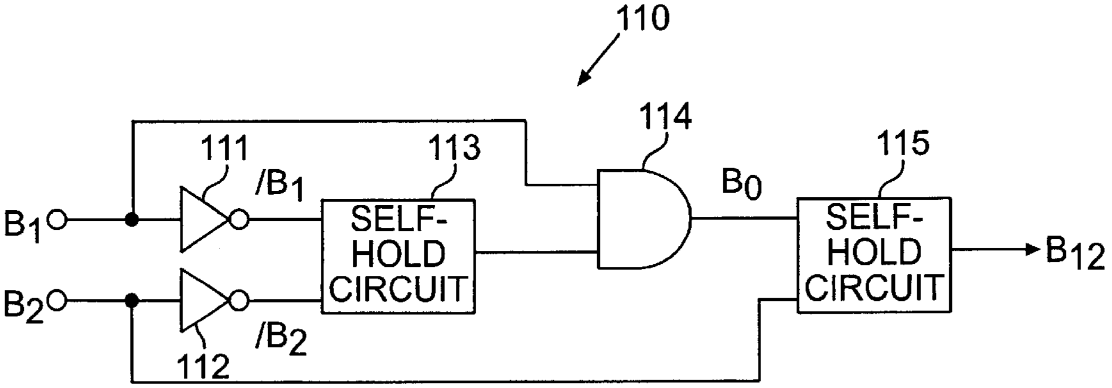
FIG. 11 is a diagram showing a direction detecting circuit to be used in the fifth embodiment.

In FIG. 11, a direction detecting circuit 110 comprises: a NOT circuit 111 for NOT operating an output signal $B_1$ of optical curtain 103; a NOT circuit 112 for NOT operating an output signal $B_2$ of optical curtain 104; a self-hold circuit 113 with an output of NOT circuit 111 as a trigger input signal, and with an output of NOT circuit 112 as a hold input; an AND gate 114 for calculating logical product of the output signal $B_1$ of optical curtain 103 and the output signal of self-hold circuit 113; and a self-hold circuit 115 with an output of AND gate 114 as a trigger input and with the output signal $B_2$ of optical curtain 104 as a hold input; in which the output of logical value "1" of this self-hold circuit 115 is made an escape confirmation signal.

Figure 12:
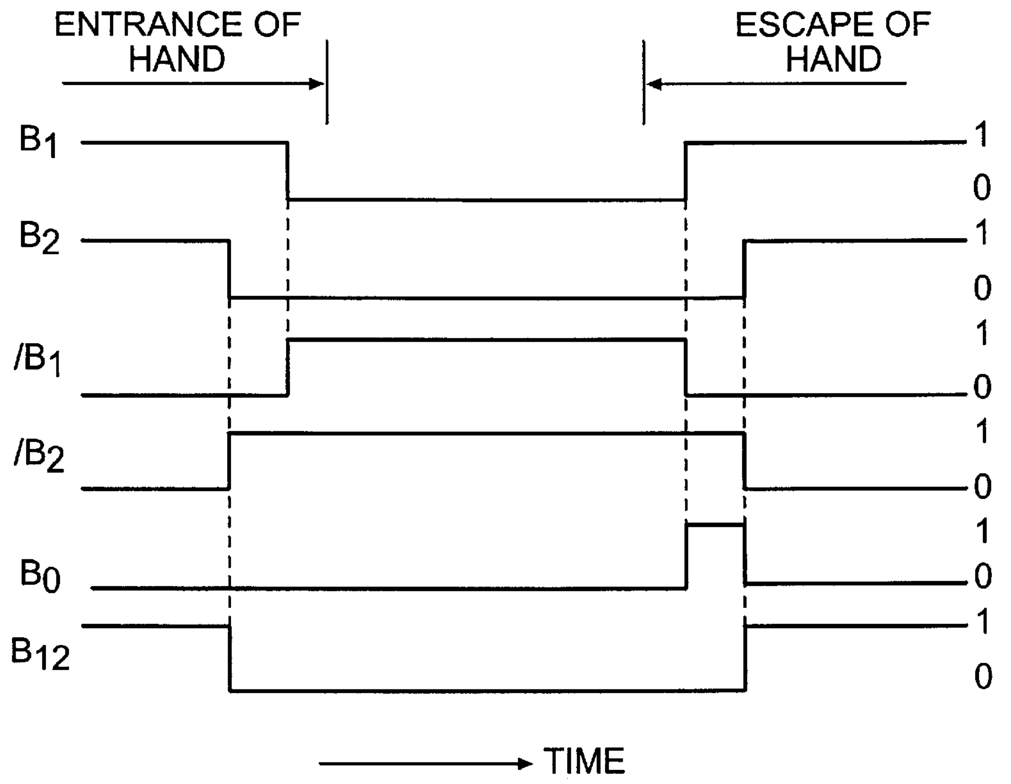
FIG. 12 is an operational time chart of the direction detecting circuit of FIG. 11.

There will be described hereinafter the operation of the circuit of FIG. 11, based on the time chart of FIG. 12.

When the operator carries in a work onto the bolster 105, the light axes $LB_2$ of optical curtain 104 are firstly interrupted, and then the light axes $LB_1$ of optical curtain 103 are interrupted. As such, the output signal $B_2$ of optical curtain 104 firstly disappears (i.e., becomes logical value "0") so that the output signal $/B_2$ (indicative of negation of output signal $B_2$) of NOT circuit 112 firstly becomes logical value "1", and then the output signal $B_1$ of optical curtain 103 disappears (i.e., becomes logical value "0") so that the output signal $/B_1$ (indicative of negation of output signal $B_1$) of NOT circuit 111 becomes logical value "1". At the time the output signal $B_2$ of optical curtain 104 has disappeared, the output signal of self-hold circuit 115, i.e., an output signal $B_{12}$ of direction detecting circuit 110, becomes logical value "0", so that the operator's hand is judged to exist over the bolster 105. Further, at the time the output signal $B_1$ of optical curtain 103 has disappeared, the self-hold circuit 113 is triggered by the output of logical value "1" from NOT circuit 111, so that one of inputs of AND gate 114 becomes logical value "1".

When the operator's hand is drawn, the output signal $B_1$ of optical curtain 103 firstly rises up to logical value "1", and then the output signal $B_2$ of optical curtain 104 rises up to logical value "1". At the time the output signal $B_1$ of optical curtain 103 has just risen up, the other input of AND gate 114 becomes logical value "1", so that an output signal $B_0$ of AND gate 114 becomes logical value "1". Thereafter, when the output signal $B_2$ of optical curtain 104 has risen up, the hold input of self-hold circuit 115 becomes logical value "1" causing the output signal $B_{12}$ of self-hold circuit 115 to become logical value "1", so that the operator's hand is judged to have escaped. In the above, the AND gate 114, and self-hold circuits 113, 115 are fail-safe constituted identically to the aforementioned embodiments. Also, the NOT circuits 111 and 112 are constituted to have the respective outputs of value "0" in case of failure, and can be realized making use of a fail-safe window comparator such as described in detail in the aforementioned U.S. Pat. No. 5,027,114.

In case that the operation apparatus for a press is provided in which the slide actuation is automatically conducted by detecting the movement of the operator's hand based on the output signal of such a light-beam type safety apparatus 100 in place of operation button, the output signal $B_{12}$ of direction detecting circuit 110 in FIG. 11 is input, instead of an ON signal of operation button, into the controlling system 1 and the slide actuation command signal $K_1$ is generated from the controlling system 1 when the output signal B12 having logical value "1" is input.

In the automatic operation press based on the output signal of light-beam type safety apparatus 100, the re-activation prevention function is not required. Thus, the output signal $K_2$ of each of monitoring circuits 10, 91 of embodiments of FIGS. 1, 4, 5 and 7 may be preferably constituted of a logical sum output of the output signal B12 of direction detecting circuit 110 in FIG. 11 and the position signal $P_a$ indicative of slide elevating process.

Figure 13:
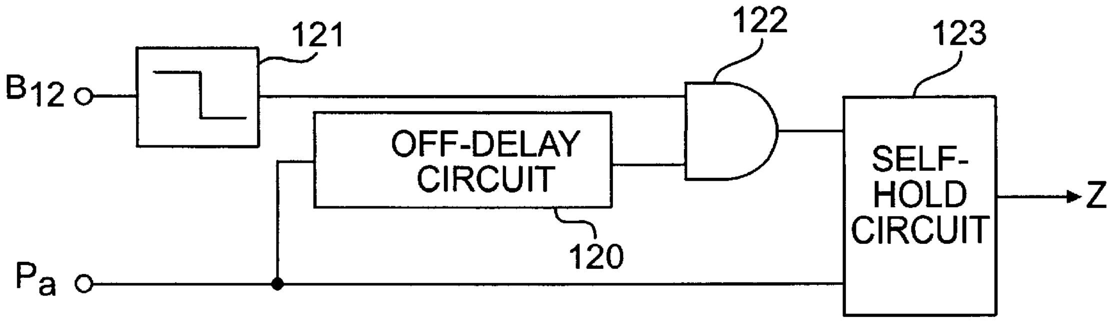
FIG. 13 is a diagram of a work-carry-in detection circuit to be applied to the fifth embodiment.

Further, as to the generation confirmation function for the operation button OFF signal /T, it is possible to obtain, such as by a circuit configuration shown in FIG. 13, an output signal of logical value "1" by detecting that the output signal $B_{12}$ of direction detecting circuit 110 has fallen within a predetermined period of time after generation of the position signal $P_a=1$, under the condition that the operator is to carry in a work within the predetermined period of time after the slide has transferred from the lowering process to the elevating process.

In the circuit of FIG. 13, if the output signal $B_{12}$ falls (generation of $(dB_{12}/dt)<0$) due to a work-carry-in operation by the operator, within a delay time (corresponding to the aforementioned predetermined period of time) of an OFF-delay circuit 120 after the time point that the position signal $P_a$ becomes "1" ($P_a=1$), an output of an AND gate 122 is caused to become logical value "1" by an output of a falling-edge detecting circuit 121, to thereby trigger a self-hold circuit 123 so that an output signal z of circuit 123 becomes logical value "1". Contrary, if the work carry in operation has not been done within the aforementioned delay time of OFF-delay circuit 120, the output of OFF-delay circuit 120 disappears so that an output signal of logical value "1" is not generated from the AND gate 122, resulting in failure of triggering of the self-hold circuit 123.

Thus, as the operation button OFF confirmation signal in FIGS. 1, 4, 5 and 7, the output signal z of self-hold circuit 123 in FIG. 13 may be input into the AND gates 24 and 24' of FIGS. 1 and 7, 61 and 61' of FIGS. 4 and 5, respectively. Only, if this function is not required, this interlock may be omitted.

As to the overrun monitoring function in case of automatic operation under omission of operation button, the slide actuation command signal $K_1$ may be input, instead of the operation button ON signal T, into each of AND gates 21, 21' in FIGS. 1, 4, 5 and 7, since the slide actuation command signal $K_1$ from controlling system 1 corresponds to the operation button ON. Further, the output signal $B_{12}$ of direction detecting circuit 110 may be adopted instead of the slide actuation command signal $K_1$.

Figure 14:
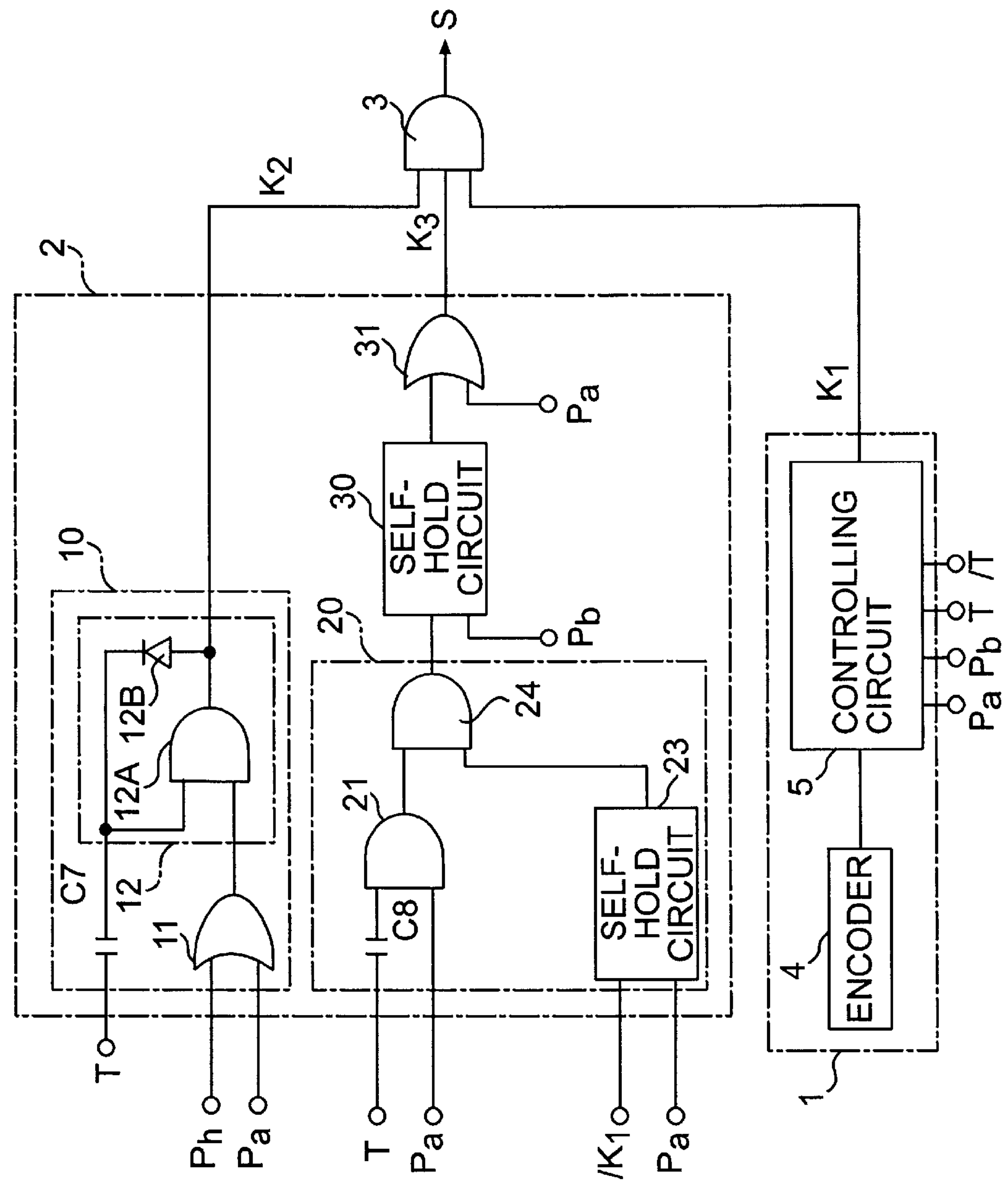
FIG. 14 is a constitutional view showing a modification of the constitution of FIG. 1.
Figure 15:
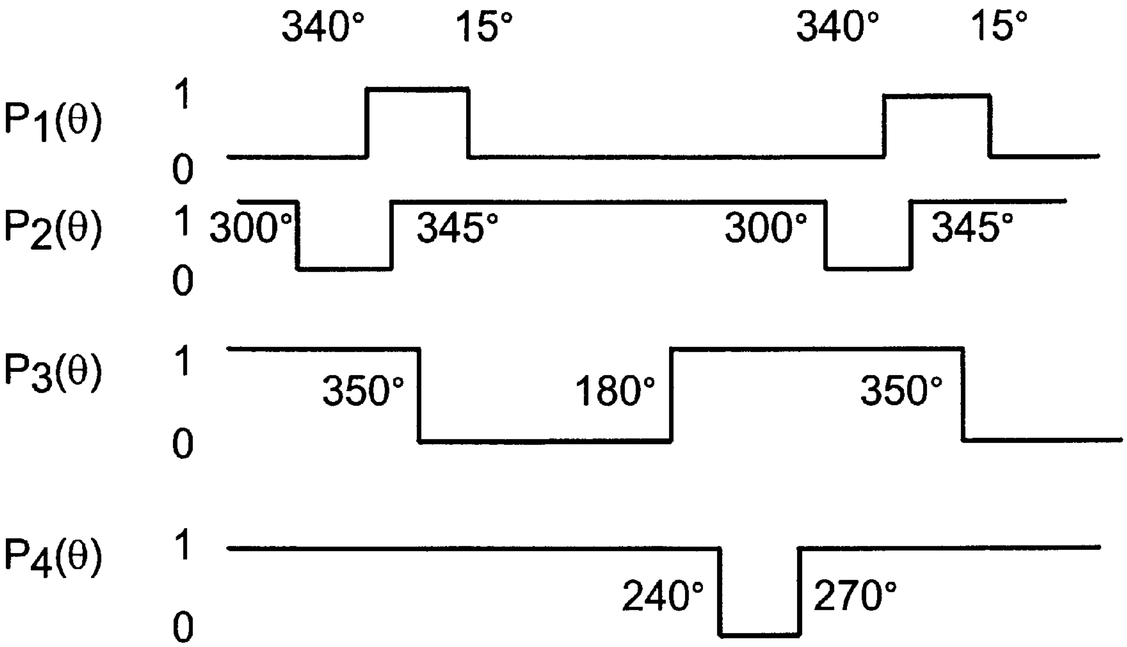
FIG. 15 PRIOR ART
FIG. 15 is a time chart of position signals used in a conventional apparatus.

Meanwhile, it is possible to input leading-edge differential signals of operation button ON signal T by capacitors C7, C8 shown in FIG. 14, respectively, such as into the trigger input of self-hold circuit 12 and the input of AND gate 21 in the circuit of FIG. 1. This differential signal is self held such as at self-hold circuit 12 or self-hold circuit 30. Further, the fact that the differential signal $dT/dt>0$ of operation button-ON signal T is generated, means that the operation button has been in an OFF state till then. Thus, by utilizing this differential signal, the self-hold circuit 22 in FIG. 1 provided for confirming the operation button OFF can be omitted as shown in FIG. 14. In this case, although the continuous monitoring of operation button OFF state can not be effected, it is possible to generate the slide actuation signal S by confirming that the operation button is in an OFF state at the time of starting of operation. According to such a constitution, two capacitors may be adopted instead of one self-hold circuit, so that the circuit configuration can be simplified thereby reducing cost.

What we claimed are:

1. An operation apparatus for a press, comprising:

a controlling system for generating a slide actuation command signal to control actuating and stopping of a slide such that said slide actuation command signal is stopped at a predetermined timing;

a monitoring system separate from said controlling system for determining whether said controlling system is operating normally and for generating a slide actuation permission signal if said controlling system is operating normally; and actuation signal generation means for generating a slide actuation signal based on input of said slide actuation command signal from said controlling system, wherein the slide actuation signal is generated only when said actuation signal generation means is input with said slide actuation permission signal from said monitoring system.

2. An operation apparatus for a press of claim 1, wherein said controlling system generates said slide actuation command signal based on an operation button ON operation by an operator, and stops said slide actuation command signal after the slide has transferred from a lowering process to a elevating process.

3. An operation apparatus for a press of claim 2, wherein said monitoring system comprises: actuation command OFF confirmation means for confirming as to whether or not said slide actuation command signal from said controlling system is stopped in the slide elevating process; and operation button-OFF confirmation means for confirming as to whether or not said operation button is turned OFF, and a logical product output of both confirmation means is input, as said slide actuation permission signal, into said actuation signal generation means.

4. An operation apparatus for a press of claim 3, wherein said monitoring system further comprises overrun confirmation means for confirming as to whether or not the slide is stopped within a range of an elevating process at the time of operation button ON operation, and a logical product output of said actuation command OFF confirmation means, operation button-OFF confirmation means and said overrun confirmation means is input, as said slide actuation permission signal, into said actuation signal generation means.

5. An operation apparatus for a press of claim 2, wherein said monitoring system comprises re-activation prevention means for stopping said slide actuation permission signal to said actuation signal generation means, when said light-beam type safety apparatus has detected entrance of human body during the slide lowering process and reinstating said slide actuation permission signal by an operation button-ON operation after the slide has been stopped, based on an output from a light-beam type safety apparatus which detects entrance of a human body into a danger zone including a bolster onto which a work is set.

6. An operation apparatus for a press of claim 5, wherein said re-activation prevention means generates said slide actuation permission signal by an operation button ON operation, under the condition that said slide actuation command signal of said controlling system has been turned OFF.

7. An operation apparatus for a press of claim 1, wherein said monitoring system comprises an overrun confirmation means for confirming as to whether or not the slide is stopped within a range of elevating process at the time said slide actuation command signal is generated and actuation command OFF confirmation means for confirming as to whether or not said slide actuation command signal from said controlling system is stopped in the slide elevating process, and a logical product output of both confirmation means is input, as said slide actuation permission signal, into said actuation signal generation means.

8. An operation apparatus for a press of claim 7, wherein said monitoring system further comprises signal resetting means for holding confirmation results of said confirmation means during the slide lowering process, and for resetting the same at the slide elevating process.

9. An operation apparatus for a press of claim 7, wherein said monitoring system has an actuation command OFF earlier confirmation function for confirming, at a crank angle position before a top dead center, as to whether or not said slide actuation command signal of said controlling system has been stopped in the slide elevating process.

10. An operation apparatus for a press of claim 1, comprising a light-beam type safety apparatus provided with a plurality of optical curtains arranged serially in a carry-in direction of a work, on a boundary position of a danger zone including a bolster and a direction detecting circuit for detecting entrance/escape of a human body into/from said danger zone, based on a state of output signal from said plurality of optical curtains, wherein said controlling system generates said slide actuation command signal based on a human body entrance/escape output from said direction detecting circuit and stops said slide actuation command signal after the slide has transferred from a lowering process to an elevating process.

11. An operation apparatus for a press of claim 10, wherein each of said plurality of optical curtains is constituted of, in a substantially vertical arranging direction, a number of light emitting elements and a number of light receiving elements opposed to each other at said boundary position of said danger zone, and light axes of each of said optical curtains are mutually offset in a vertical direction.

12. An operation apparatus for a press of claim 1, wherein said monitoring system is constituted in a fail-safe manner such that: said monitoring system generates said slide actuation permission signal having logical value "1" when judging that said controlling system is normal; and said slide actuation permission signal becomes logical value "0" when said controlling system is abnormal or when said monitoring system itself fails.

13. An operation apparatus for a press of claim 12, wherein said monitoring system comprises:

first monitoring means comprising: a first OR circuit for calculating logical sum of a first position signal and an output signal of a light-beam type safety apparatus, said first position signal being output from position signal generating means which generates said first position signal which becomes logical value "1" when the slide is in the elevating process, and a second position signal which becomes logical value "1" when the slide is in the lowering process; and a first self-hold circuit having an output of said first OR circuit as a hold input thereof, and an operation button ON signal which becomes logical value "1" by an operation button ON operation as a trigger input thereof, said first self-hold circuit being adapted to self-hold said trigger input;

second monitoring means comprising: a first AND circuit for calculating logical product of said first position signal and said operation button ON signal; a second self-hold circuit having said first position signal as a hold input thereof and an operation button OFF signal which becomes logical value "1" by an operation button OFF operation as a trigger input thereof, said second self-hold circuit being adapted to self hold said trigger input; a third self-hold circuit having said first position signal as a hold input thereof and a slide actuation command OFF signal which becomes logical value "1" when said slide actuation command signal of said controlling system is stopped as a trigger input thereof, said third self-hold circuit being adapted to self hold said trigger input; and a second AND circuit for calculating logical product of the outputs of said first AND circuit and said second and third self-hold circuits;

a fourth self-hold circuit having said second position signal as a hold input thereof and an output of said second AND circuit as a trigger input thereof, and for self holding said trigger input; and a second OR circuit for calculating logical sum of an output of said fourth self-hold circuit and said first position signal; and wherein said outputs of said first self-hold circuit and said second OR circuit are input, as said slide actuation permission signal, into said actuation signal generation means.

14. An operation apparatus for a press of claim 13, wherein said first self-hold circuit of said first monitoring means has a leading-edge differential signal of said operation button ON signal as a trigger input thereof, said first AND circuit of said second monitoring means calculates logical product of said first position signal and said leading-edge differential signal of said operation button-ON signal, and said second self-hold circuit is omitted from said second monitoring means.

15. An operation apparatus for a press of claim 13, wherein said monitoring system comprises, instead of said second monitoring means, said fourth self-hold circuit and said second OR circuit:

first monitoring part comprising: a third AND circuit for calculating logical product of outputs of said first AND circuit and said second self-hold circuit; and a first flip-flop circuit having an output of said third AND circuit as a set input and a leading-edge differential signal of said first position signal as a reset input;

a second monitoring part comprising a second flip-flop circuit having said slide actuation command OFF signal as a set input and input with a leading-edge differential signal of said first position signal as a reset input;

a first oscillating means which oscillates when said first flip-flop circuit is reset;

a second oscillating means which oscillates when said first flip-flop circuit is set;

a third oscillating means which oscillates when said second flip-flop circuit is reset;

a fourth oscillating means which oscillates when said second flip-flop circuit is set;

a fourth AND circuit for calculating logical product of the outputs of said second and fourth oscillating means;

a fifth AND circuit for calculating logical product of outputs of said first and third oscillating means and an output of said first position signal; and a third OR circuit for calculating logical sum of outputs of said fourth and fifth AND circuits; and wherein the outputs of said first self-hold circuit and said third OR circuit are input, as said slide actuation permission signal, into said actuation signal generation means.

16. An operation apparatus for a press of claim 13, wherein said monitoring system comprises, instead of said second monitoring means, said fourth self-hold circuit and said second OR circuit:

third monitoring part comprising: a fifth self-hold circuit; a sixth AND circuit for calculating logical product of outputs of said first AND circuit and said second and fifth self-hold circuits; and a third flip-flop circuit having an output of said sixth AND circuit as a set input and a leading-edge differential signal of said slide actuation command OFF signal as a reset input;

a fifth oscillating means which oscillates when said third flip-flop circuit is reset;

a sixth oscillating means which oscillates when said third flip-flop circuit is set; and a fourth OR circuit for calculating logical sum of an output of said sixth oscillating means and said first position signal; and wherein said fifth self-hold circuit has said first position signal as a hold input and the output of said fifth oscillating means as a trigger input, and self-holds said trigger input, and the outputs of said first self-hold circuit and said fourth OR circuit are input, as said slide actuation permission signal, into said actuation signal generation means.

17. An operation apparatus for a press of claim 13, wherein said position signal generating means is constituted such that said first position signal becomes logical value "1" in a crank angle range of from a bottom dead center to a predetermined angle after a top dead center, and said second position signal becomes logical value "1" in a crank angle range of from the predetermined angle after the top dead center to the bottom dead center.

18. An operation apparatus for a press of claim 13, wherein said position signal generating means is constituted of two disks fixed to a crankshaft connected to the slide; each of said disks being provided with an optical sensor comprising a light emitting element and a light receiving element facing each other across the disk, the optical sensor provided on one of said disks receiving, by means of said light receiving element, a light from said light emitting element in the crank angle range corresponding to the slide elevating process, and the optical sensor provided on the other disk receiving, by means of said light receiving element, a light from said light emitting element in the crank angle range corresponding to the slide lowering process, to generate light receiving signals, so that the light receiving signals from the respective optical sensors are made to be the first position signal and the second position signal, respectively.

19. An operation apparatus for a press of claim 12, wherein said monitoring system comprises:

third monitoring means comprising: a fifth OR circuit for calculating logical sum of a first position signal and an output signal of a light-beam type safety apparatus, said first position signal being output from position signal generating means which generates said first position signal which becomes logical value "1" when the slide is in the elevating process, and a second position signal which becomes logical value "1" when the slide is in the lowering process which includes a slide elevating process just before the transference to the lowering process of slide; a seventh AND circuit for calculating logical product of a leading-edge differential signal of operation button ON signal and said second position signal; and a sixth self-hold circuit having an output of said fifth OR circuit as a hold input thereof, and an output of said seventh AND circuit as a trigger input thereof, said sixth self-hold circuit being adapted to self-hold said trigger input;

fourth monitoring means comprising: an eighth AND circuit for calculating logical product of said first and second position signals and a leading-edge differential signal of said operation button ON signal; a seventh self-hold circuit having said first position signal as a hold input thereof and an operation button OFF signal which becomes logical value "1" by an operation button OFF operation as a trigger input thereof, said seventh self-hold circuit being adapted to self hold said trigger input; an eighth self-hold circuit having said first position signal as a hold input thereof and a slide actuation command OFF signal which becomes logical value "1" when said slide actuation command signal of said controlling system is stopped as a trigger input thereof, said eighth self-hold circuit being adapted to self hold said trigger input; and a ninth AND circuit for calculating logical product of the outputs of said eighth AND circuit and said seventh and eighth self-hold circuits;

fifth monitoring means comprising: an adding circuit for adding output levels of said first and second position signals; a window comparator for threshold-value calculating an added output level of said adding circuit to thereby generate an output only when said added output level corresponds to logical value "1" ; and a sixth OR circuit for calculating an logical sum of an output of said window comparator and the output of said eighth self-hold circuit of said fourth monitoring means;

a ninth self-hold circuit which has said second position signal as a hold input thereof and an output of said ninth AND circuit of said fourth monitoring means as a trigger input thereof, and self holds said trigger input; and a seventh OR circuit for calculating logical sum of an output of said ninth self-hold circuit and said first position signal; and wherein said outputs of said sixth self-hold circuit and said sixth and seventh OR circuits are input, as said slide actuation permission signal, into said actuation signal generation means.

20. An operation apparatus for a press of claim 18, wherein said position signal generating means is constituted such that said first position signal becomes logical value "1" in a crank angle range of from a bottom dead center to a predetermined angle after a top dead center, and said second position signal becomes logical value "1" in a crank angle range of from the predetermined angle before the top dead center to the bottom dead center.

* * * * *

UNITED STATES PATENT AND TRADEMARK OFFICE

CERTIFICATE OF CORRECTION

PATENT NO. : 6,334,077 B1
DATED : December 25, 2001
INVENTOR(S) : Koichi Futsuhara et al.

It is certified that error appears in the above-identified patent and that said Letters Patent is hereby corrected as shown below:

Column 17,
Line 5, "timing" should read -- time --.

Column 22,
Line 16, "claim 18" should read -- claim 19 --.

Signed and Sealed this

Twelfth Day of November, 2002

*Attest:*

JAMES E. ROGAN

*Attesting Officer* *Director of the United States Patent and Trademark Office*